(12) United States Patent
Allen et al.

(10) Patent No.: US 11,816,621 B2
(45) Date of Patent: Nov. 14, 2023

(54) MULTI-COMPUTER TOOL FOR TRACKING AND ANALYSIS OF BOT PERFORMANCE

(71) Applicant: Bank of America Corporation, Charlotte, NC (US)

(72) Inventors: Nye W. Allen, Charlotte, NC (US); Desmond Ebanks, Matthews, NC (US); Sunil Melam, Middletown, DE (US)

(73) Assignee: Bank of America Corporation, Charlotte, NC (US)

( * ) Notice: Subject to any disclaimer, the term of this patent is extended or adjusted under 35 U.S.C. 154(b) by 148 days.

(21) Appl. No.: 17/510,971

(22) Filed: Oct. 26, 2021

(65) Prior Publication Data

US 2023/0131762 A1   Apr. 27, 2023

(51) Int. Cl.
*G06Q 10/0639* (2023.01)
*G05B 19/4155* (2006.01)

(52) U.S. Cl.
CPC ..... *G06Q 10/0639* (2013.01); *G05B 19/4155* (2013.01); *G05B 2219/50391* (2013.01)

(58) Field of Classification Search
None
See application file for complete search history.

(56) References Cited

U.S. PATENT DOCUMENTS

| 10,713,662 | B1 * | 7/2020 | Narayanan | G06Q 30/016 |
| 11,288,557 | B2 * | 3/2022 | Gligan | G06F 16/93 |
| 2003/0177060 | A1 | 9/2003 | Seagraves | |
| 2004/0010459 | A1 | 1/2004 | Zatlukal | |
| 2004/0133897 | A1 | 7/2004 | Covely | |
| 2004/0167788 | A1 | 8/2004 | Birimisa et al. | |
| 2004/0225583 | A1 | 11/2004 | Joodi | |
| 2004/0236617 | A1 | 11/2004 | Bert | |
| 2005/0033607 | A1 | 2/2005 | Georgiou et al. | |
| 2005/0137950 | A1 | 6/2005 | Palozzi et al. | |
| 2005/0149422 | A1 | 7/2005 | Van Lier | |
| 2005/0154654 | A1 | 7/2005 | Berstis et al. | |

(Continued)

FOREIGN PATENT DOCUMENTS

WO   WO-2015057255 A1 * 4/2015 ............. G06F 21/31

OTHER PUBLICATIONS

Wil et al "Robotic Process Automation", May 2018, Business & Information Systems Engineering 60, 269-272 (Year: 2018).*

*Primary Examiner* — Romain Jeanty
(74) *Attorney, Agent, or Firm* — Banner & Witcoff, Ltd.

(57) ABSTRACT

Aspects of the disclosure relate to intelligent bot performance tracking and analysis. A computing platform may receive a work queue of items to be processed using a bot. The computing platform may receive, in real-time with processing of the work queue using the bot, metadata associated with the work queue. Based on the metadata, the computing platform may assign, in real-time, a value metric associated with completion of each item in the work queue. Based on the assigned value metric, the computing platform may identify a robotic process automation cost associated with processing the work queue via the bot. The computing platform may compare, the robotic process automation cost to a cost to process the work queue via another operation, and determine a performance metric for the bot based on the comparison. The computing platform may dynamically generate and transmit, in real-time, an indication of the determined bot performance metric.

20 Claims, 8 Drawing Sheets

(56) References Cited

U.S. PATENT DOCUMENTS

| | | |
|---|---|---|
| 2006/0053072 A1 | 3/2006 | Milleker et al. |
| 2007/0192170 A1 | 8/2007 | Cristol |
| 2008/0133210 A1 | 6/2008 | Chagoly et al. |
| 2017/0269972 A1 | 9/2017 | Hosabettu et al. |
| 2018/0197123 A1* | 7/2018 | Parimelazhagan ........................ G06Q 10/0633 |
| 2020/0050983 A1 | 2/2020 | Balasubramanian et al. |
| 2020/0348964 A1* | 11/2020 | Anand .................. G06F 9/5005 |
| 2020/0384644 A1 | 12/2020 | Chae |
| 2020/0387358 A1 | 12/2020 | Chae |
| 2021/0051203 A1 | 2/2021 | Sathianarayanan et al. |
| 2021/0107140 A1 | 4/2021 | Singh et al. |
| 2021/0117742 A1* | 4/2021 | Gligan ................ G06K 15/1856 |
| 2021/0191760 A1* | 6/2021 | Madkour ................ G06Q 10/10 |
| 2021/0248514 A1 | 8/2021 | Cella et al. |
| 2022/0067599 A1* | 3/2022 | Yurovsky ............ G06Q 10/0631 |
| 2022/0156540 A1* | 5/2022 | Gligan .................. G06F 16/338 |

\* cited by examiner

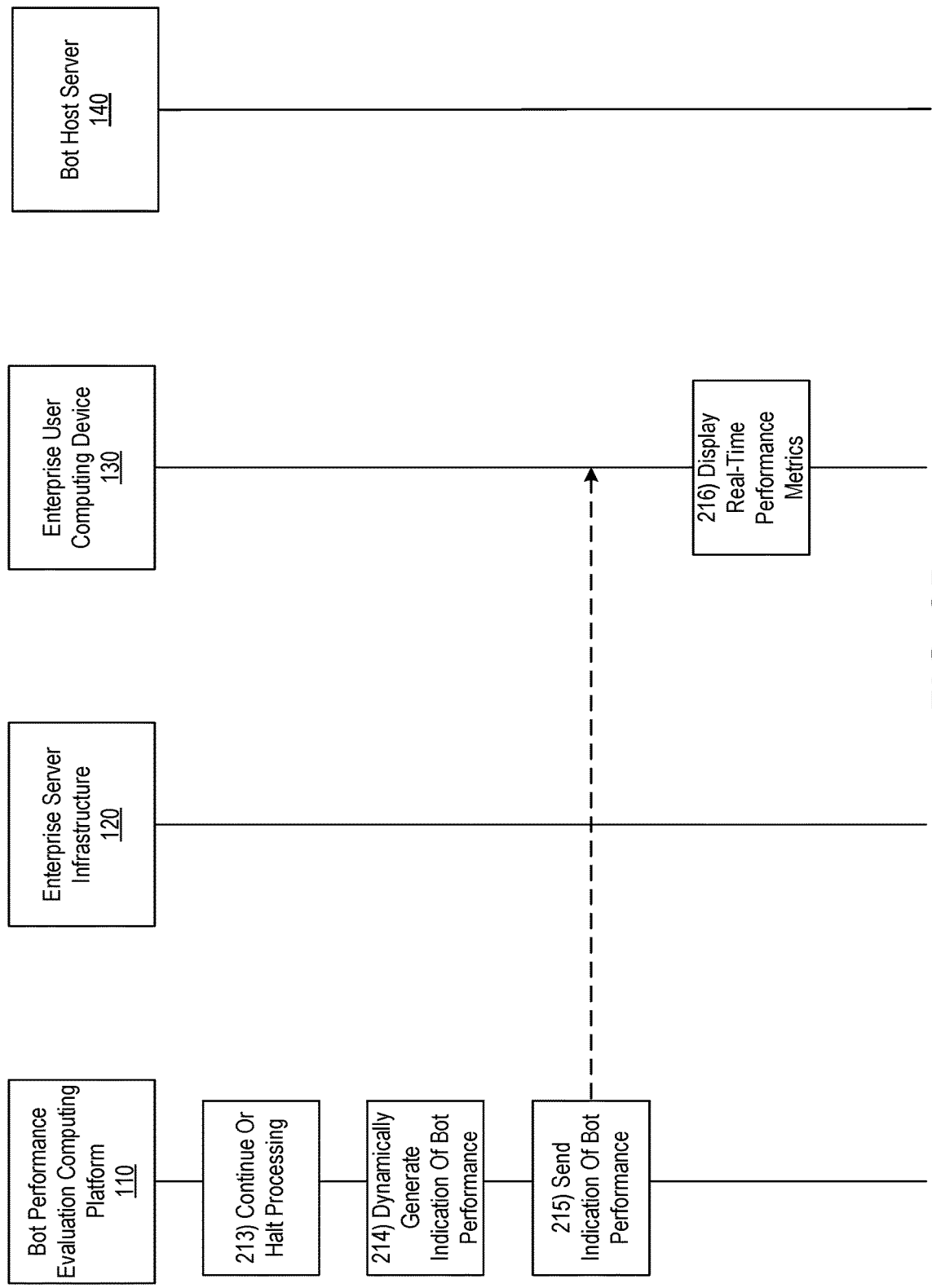

MULTI-COMPUTER TOOL FOR TRACKING AND ANALYSIS OF BOT PERFORMANCE

BACKGROUND

Aspects of the disclosure generally relate to one or more computer systems, servers, and/or other devices including hardware and/or software. In particular, one or more aspects of the disclosure relate to an intelligent bot tool for tracking and facilitating analysis of bot performance.

Robotic process automation (RPA) may offer a number of benefits, such as reducing manual and repetitive tasks, which leads to cost reduction and time savings, for example. In many instances, it may be difficult to quantify those benefits. In some instances, bot performance may be captured manually through the use of spreadsheets. In many instances, it may be difficult to accurately and consistently track bot performance that results from automating a process.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with evaluating the effectiveness of robotic process automation. In accordance with one or more embodiments, a computing platform having at least one processor, a communication interface, and memory may receive a work queue of items to be processed using a robotic process automation (RPA) bot. Subsequently, the computing platform may receive, in real-time with processing of the work queue of items using the bot, metadata associated with the work queue of items. Next, the computing platform may assign, in real-time, based on the metadata, a value metric associated with completion of each item in the work queue of items. Thereafter, the computing platform may identify, based on the assigned value metric, a robotic process automation cost associated with processing the work queue of items via the bot. The computing platform may compare the robotic process automation cost to a cost to process the work queue of items via another operation. The computing platform may determine a performance metric for the bot based on the comparison. Then, the computing platform may dynamically generate, in real-time, an indication of the determined performance metric for the bot. The computing platform may transmit, to a user computing device for display, the dynamically generated indication.

In some embodiments, the computing platform may, based on the performance metric for the bot being below a predetermined threshold, halt processing of the work queue of items using the bot.

In some arrangements, assigning the value metric associated with completion of each item in the work queue of items may include retrieving one or more value metrics from a database.

In some examples, the value metric may include a value in a currency.

In some embodiments, the computing platform may dynamically update the performance metric for the bot as new items in the work queue of items are processed.

In some example arrangements, the bot may be an attended bot. In some embodiments, the bot may be an unattended bot.

In some examples, the cost to process the work queue of items via another operation may be associated with implementing functions of the bot via a method other than robotic process automation.

In some embodiments, identifying the robotic process automation cost may include identification of one or more of: a salary cost, a build cost, a license cost, or a support cost.

In some embodiments, each item in the work queue of items may correspond to a transaction processing task.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for intelligent bot performance tracking and analysis in accordance with one or more example arrangements;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to evaluating the effectiveness of robotic process automation. In particular, one or more aspects of the disclosure allow a system to uniformly measure the performance, such as a return on investment (ROI) of an RPA deployment in real-time. In some embodiments, the performance or performance measure may include an ROI that may be a cumulative savings amount that is calculated as bots are run. For instance, as a bot is run, a number of widgets or transactions produced by the bot may be tracked and a benefit may be quantified in real-time. Additional aspects of the disclosure may provide a proof of concept that a bot runs optimally (e.g., that it increased efficiency and achieved the expected financial objectives). Further aspects of the disclosure may identify an organization's automation potential.

Figure 1A:
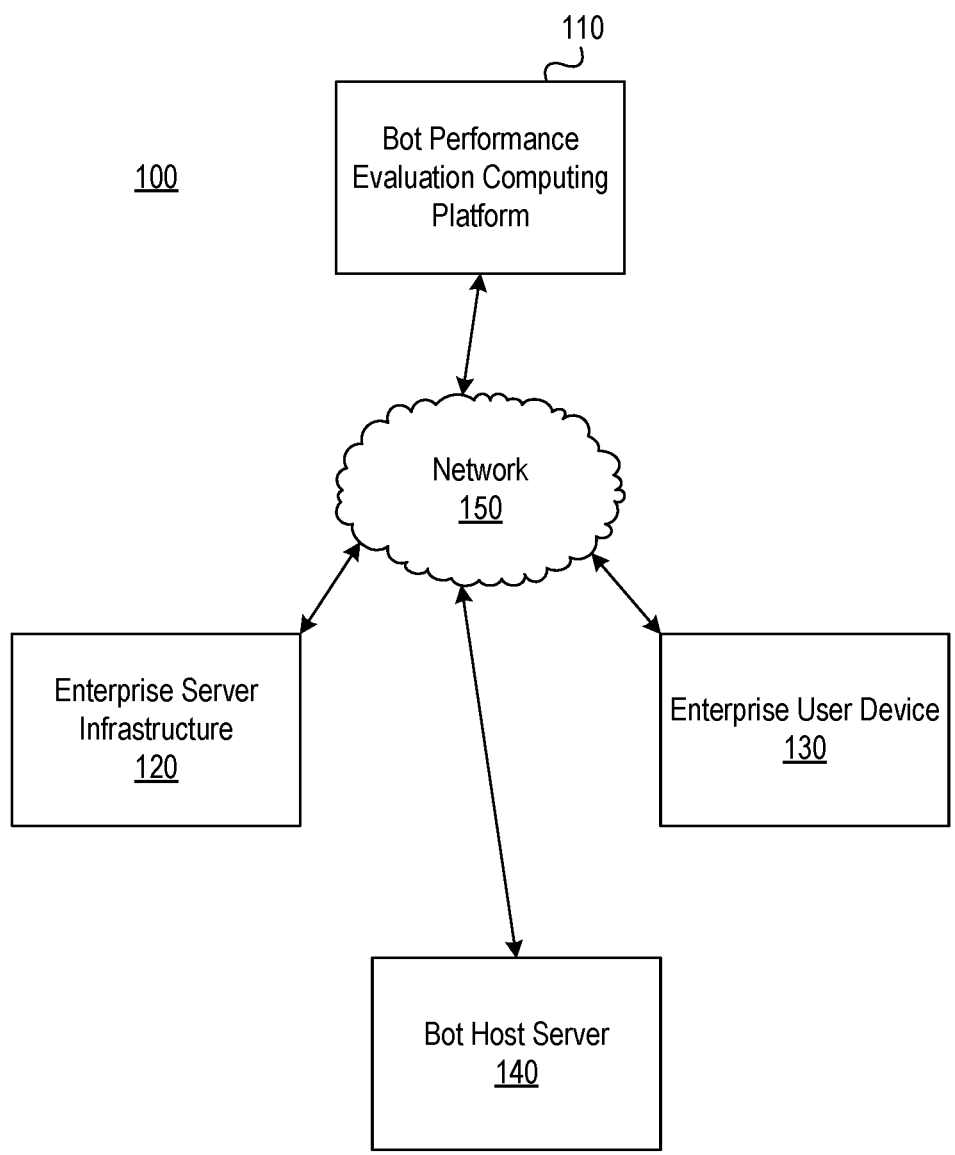
FIGS. 1A and 1B depict an illustrative computing environment for intelligent bot performance tracking and analysis in accordance with one or more example arrangements.
Figure 1B:
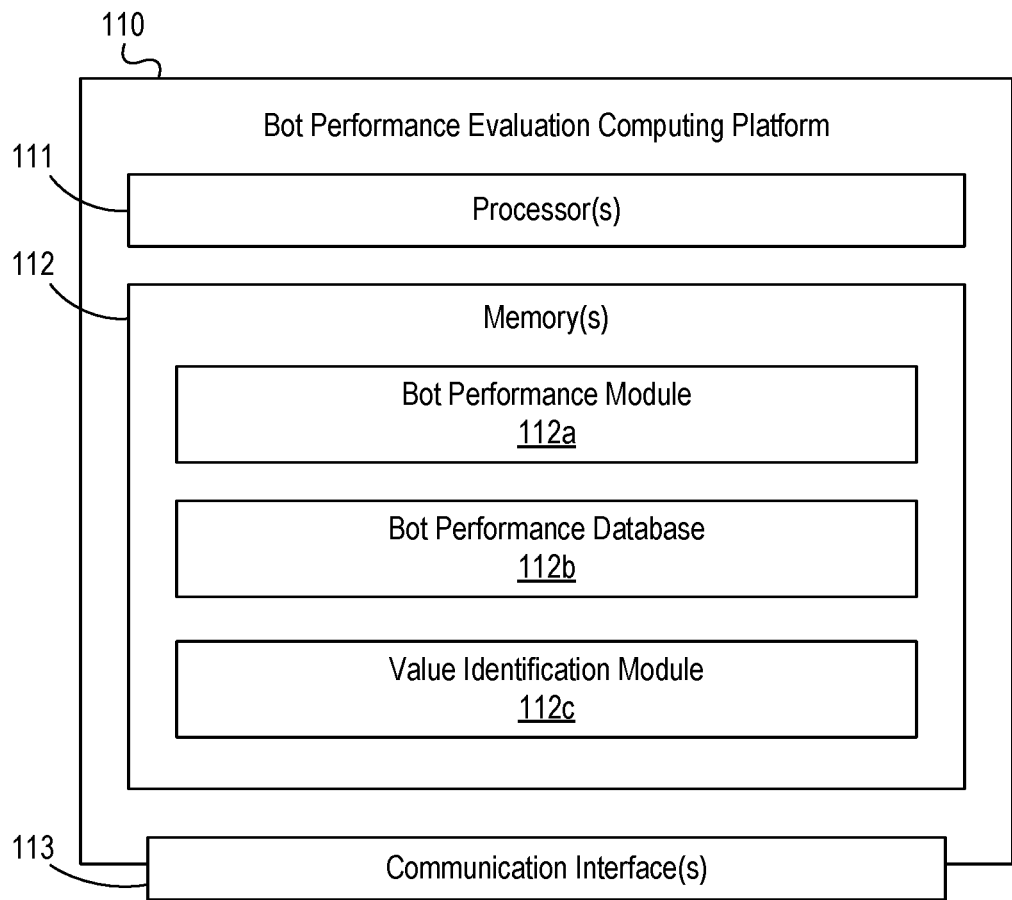

FIGS. 1A and 1B depict an illustrative computing environment for intelligent bot performance tracking and analysis in accordance with one or more example arrangements. Referring to FIG. 1A, computing environment 100 may include one or more devices (e.g., computer systems, communication devices, servers). For example, computing environment 100 may include a bot performance evaluation computing platform 110, an enterprise server infrastructure 120, an enterprise user computing device 130, and a bot host server 140.

As described further below, bot performance computing platform 110 may be a computer system that includes one or more computing devices (e.g., servers, server blades, or the like) and/or other computer components (e.g., processors, memories, communication interfaces) that may be used to implement bot performance tracking and analysis, or the like to track bot performance and monitor bots in real-time to determine bot performance accordingly. In some instances, bot performance computing platform 110 may be maintained by an enterprise organization (e.g., a financial institution, or the like) and may be configured to receive process step information relating to one or more enterprise processes and determine a performance measure, such as ROI, of a bot in completing a current work queue. In some instances, bot performance computing platform 110 may be configured to maintain a robotic process automation model that stores correlations between process step information, and other parameters relating to completing a workload, and may be configured to update the bot performance based on received information.

Enterprise server infrastructure 120 may include one or more computing devices and/or other computer components (e.g., processors, memories, communication interfaces). In some arrangements, enterprise server infrastructure 120 may include a server, server blade, or the like configured to host an enterprise service (e.g., a mobile banking application, ATM service, or the like). In one or more instances, the enterprise server infrastructure 120 may be configured to communicate with enterprise user devices (e.g., enterprise user computing device 130, or the like) to process workload based on various parameters and user inputs received at enterprise user devices. In some instances, the enterprise server infrastructure 120 may be configured to cause display (e.g., at enterprise user computing device 130, or the like), of a particular user interface based on information received from bot performance computing platform 110.

Enterprise user device 130 may include one or more computing devices and/or other computer components (e.g., processors, memories, communication interfaces). In some arrangements, enterprise user computing device 130 may be a desktop computer, laptop computer, tablet, mobile device, or the like, and may be used by an individual such as a client or employee of an enterprise organization (e.g., a financial institution, or the like). For example, enterprise user computing device 130 may be configured to communicate with enterprise server infrastructure 120 to facilitate display of user interfaces (e.g., interfaces that generate a report of a performance measure, such as ROI, associated with a bot, updates to the performance calculations, or the like) based on received workload information.

In some arrangements, enterprise user computing device 130 may be linked to and/or used by one or more enterprise users (who may, e.g., be employees of an enterprise organization operating the enterprise center where enterprise user computing device 130 is deployed and/or used). For instance, enterprise user computing device 130 may be deployed at an enterprise center, such as the enterprise center where enterprise server infrastructure 120 is deployed, so that enterprise user computing device 130 may be used by one or more employees of an enterprise organization operating the enterprise center. For example, enterprise user computing device 130 may store and/or execute one or more enterprise applications, such as account creation and management applications, transaction history applications, lending applications, brokerage applications, and/or other applications, which may be used by the one or more enterprise users of enterprise user computing device 130.

Bot host server 140 may include one or more computing devices and/or other computer components (e.g., processors, memories, communication interfaces). In addition, bot host server 140 may include a bot orchestrator which may be configured to generate, host, transmit, and/or otherwise provide one or more bots (which may, e.g., process items from a work queue using at least one bot). The bots may be software agents provisioned by robotic process automation using user interface (UI) and surface-level features to create scripts that automate tasks (e.g., routine, predictable tasks). In some examples, the bots may be provisioned after a review and approval process.

Computing environment 100 also may include one or more networks, which may interconnect bot performance computing platform 110, enterprise server infrastructure 120, enterprise user computing device 130, bot host server 140, or the like. For example, computing environment 100 may include a network 150 (which may interconnect, e.g., bot performance computing platform 110, enterprise server infrastructure 120, enterprise user computing device 130, bot host server 140, and/or one or more other systems which may be associated with an enterprise organization, such as a financial institution, with one or more other systems, public networks, sub-networks, and/or the like).

In one or more arrangements, bot performance computing platform 110, enterprise server infrastructure 120, enterprise user computing device 130, and bot host server 140, may be any type of computing device capable of sending and/or receiving workload data and processing the workloads accordingly. For example, bot performance computing platform 110, enterprise server infrastructure 120, enterprise user computing device 130, bot host server 140, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of bot performance computing platform 110, enterprise server infrastructure 120, enterprise user computing device 130, and/or bot host server 140 may, in some instances, be special-purpose computing devices configured to perform specific functions as described herein.

As illustrated in greater detail below, bot performance computing platform 110 may include one or more computing devices configured to perform one or more of the functions described herein. For example, bot performance computing platform 110 may include one or more computers (e.g., laptop computers, desktop computers, servers, server blades, or the like).

Referring to FIG. 1B, bot performance computing platform 110 may include one or more processors 111, memory 112, and communication interface 113. A data bus may interconnect processor 111, memory 112, and communication interface 113. Communication interface 113 may be a network interface configured to support communication between bot performance computing platform 110 and one or more networks (e.g., network 150, or the like). Memory 112 may include one or more program modules having instructions that when executed by processor 111 cause bot performance computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of bot performance computing platform 110 and/or by different computing devices that may form and/or otherwise make up bot performance computing platform 110. For example, memory 112 may have, host, store, and/or include bot performance module 112a, robotic process automation database 112b, and value identification module 112c.

Bot performance module 112a may have instructions that direct and/or cause bot performance module 112a to execute robotic process automation tracking techniques related to RPA-based workloads, as discussed in greater detail below. Bot performance database 112b may store information used by bot performance module 112a and/or bot performance computing platform 110 in application of robotic process automation tracking techniques related to completing RPA-based workloads (e.g., using metadata to capture an ROI), and/or in performing other related functions for processing and maintaining enterprise-managed information and resources. Value identification module 112c may have instructions that direct and/or cause bot performance computing platform 110 to set, define, and/or iteratively refine values (e.g., associated with at least one transaction or unit of work) used by bot performance computing platform 110 and/or other systems in computing environment 100.

Figure 2A:
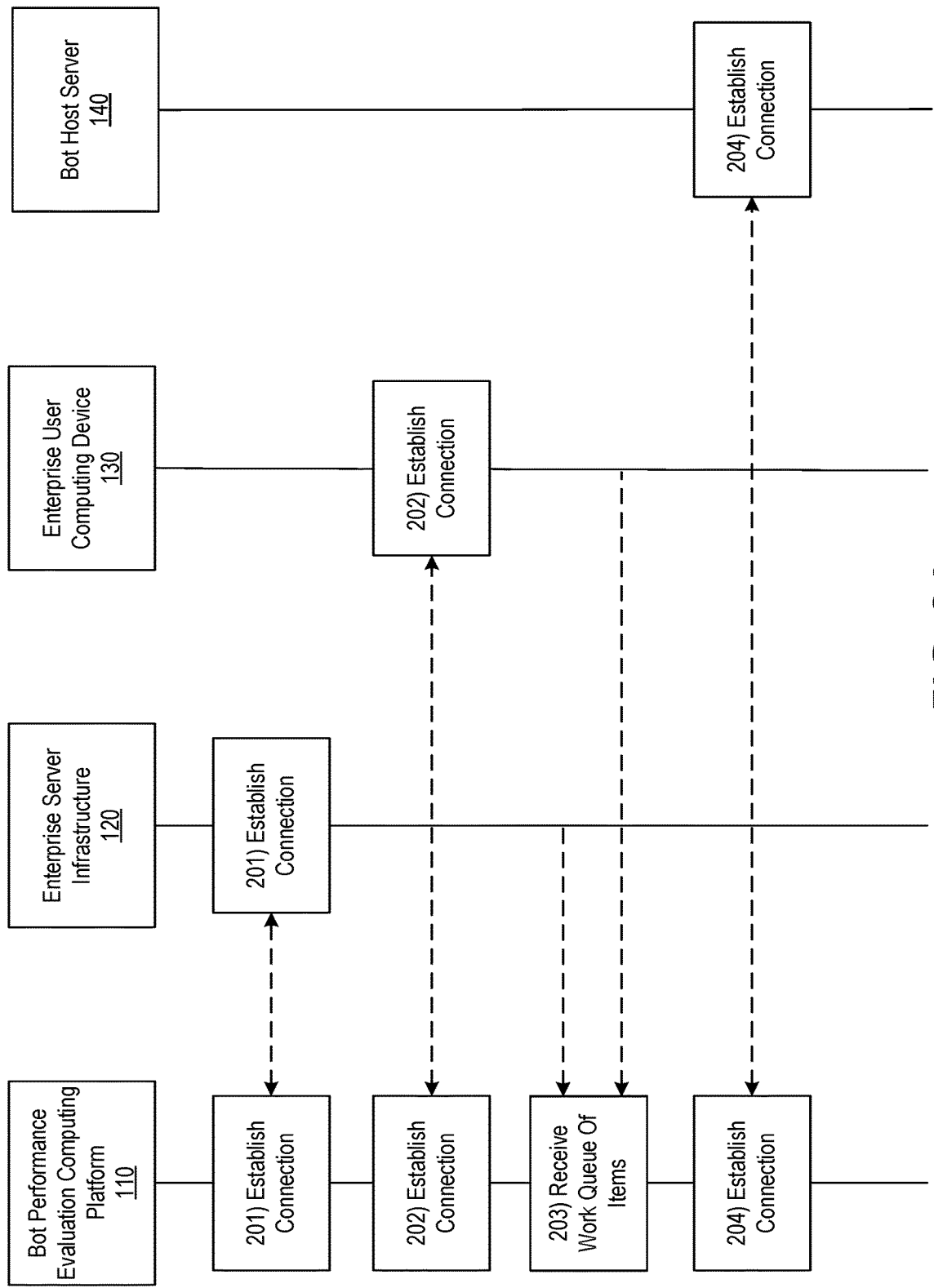

FIGS. 2A-2D depict an illustrative event sequence for intelligent bot performance tracking and analysis in accordance with one or more example arrangements. Referring to FIG. 2A, at step 201, bot performance computing platform 110 may establish a connection with enterprise server infrastructure 120. For example, bot performance computing platform 110 may establish a first wireless data connection with enterprise server infrastructure 120 to link bot performance computing platform 110 with enterprise server infrastructure 120. In some instances, bot performance computing platform 110 may identify whether or not a connection is already established with the enterprise server infrastructure 120. If a connection is already established with enterprise server infrastructure 120, bot performance computing platform 110 might not re-establish the connection. If a connection is not yet established with enterprise server infrastructure 120, bot performance computing platform 110 may establish the first wireless data connection as described above.

At step 202, bot performance computing platform 110 may establish a connection with enterprise user computing device 130. For example, bot performance computing platform 110 may establish a second wireless data connection with enterprise user computing device 130 to link bot performance computing platform 110 with enterprise user computing device 130. In some instances, bot performance computing platform 110 may identify whether or not a connection is already established with enterprise user computing device 130. If a connection is already established with enterprise user computing device 130, bot performance computing platform 110 might not re-establish the connection. If a connection is not yet established with the enterprise user computing device 130, bot performance computing platform 110 may establish the second wireless data connection as described above.

At step 203, bot performance computing platform 110 may receive process step information (e.g., a work queue of items) associated with a given bot. Each item in the work queue of items may correspond to a transaction processing task. For example, transaction processing tasks may include actions such as collecting data, filtering out information, transferring data to a destination, and may be associated with work such as invoice processing, loan processing, document transfer, other enterprise-related process tasks, etc.). In some examples, the process step information may be sent from the enterprise server infrastructure and/or the enterprise user computing device 130. The process step information may be sent or loaded by a process running on a server in the enterprise server infrastructure 120. In some examples, bot performance computing platform 110 may receive the process step information from one or more data source computer systems (e.g., from enterprise server infrastructure 120, enterprise user computing device 130, and/or one or more other data sources). The process step information may, for instance, include data that is transmitted by and/or received from internal event feeds (e.g., feeds originating from sources within the enterprise organization), external event feeds (e.g., feeds originating from sources outside of the enterprise organization), internal enterprise systems (e.g., systems within the enterprise organization), external enterprise systems (e.g., systems outside of the enterprise organization), and/or other sources.

For example, at step 203, bot performance computing platform 110 may receive, via the communication interface (e.g., communication interface 113) and while the first and/or second wireless data connection is established, from one or more data source computer systems (e.g., from enterprise server infrastructure 120, enterprise user computing device 130, and/or one or more other data sources), a work queue of items to be processed using a robotic process automation (RPA) bot. In some examples, the bot may be an attended bot (e.g., triggered by user events). In some examples, the bot may be an unattended bot (e.g., automated end-to-end).

At step 204, bot performance computing platform 110 may establish a connection with bot host server 140. For example, bot performance computing platform 110 may establish a third wireless data connection with bot host server 140 to link bot performance computing platform 110 with bot host server 140. In some instances, bot performance computing platform 110 may identify whether or not a connection is already established with the bot host server 140. If a connection is already established with bot host server 140, bot performance computing platform 110 might not re-establish the connection. If a connection is not yet established with bot host server 140, bot performance computing platform 110 may establish the third wireless data connection as described above.

Figure 2B:
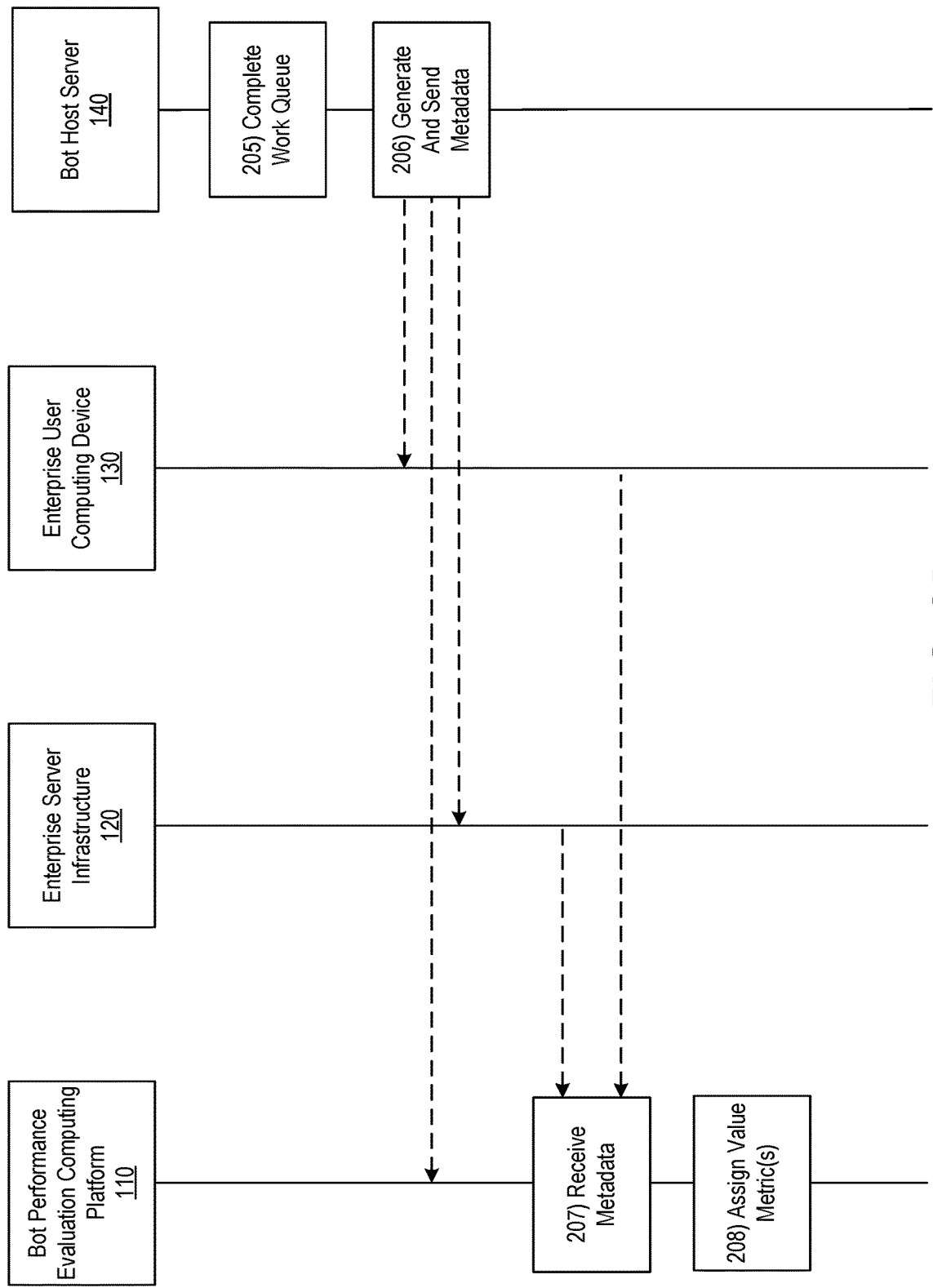

Referring to FIG. 2B, at step 205, bot host server 140 may determine availability of one or more bots, assign tasks to one or more bots (e.g., based on availability and capability), schedule one or more bots to run (e.g., based on prioritization of work queues), and process and complete the work queue using the one or more bots. In some instances, step 205 may include transmitting a notification to the bot performance computing platform 110 that the work queue has been completed. At step 206, the bot host server 140 may generate and send metadata information relating to the processing and completion of the work queue to the bot performance computing platform 110, the enterprise server infrastructure 120 and/or the enterprise user computing device 130. For instance, at step 206, metadata information related to the work queue may be added to a database on the enterprise server infrastructure 120, enterprise user computing device 130, bot performance computing platform 110, and/or the like.

At step 207, bot performance computing platform 110 may receive, in real-time with processing of the work queue of items using the bot, the metadata information associated with the work queue of items. For example, the metadata information may be sent from the enterprise server infrastructure 120 and/or the enterprise user computing device 130. The metadata information may be sent or loaded by a process running on a server in the enterprise server infrastructure 120.

For example, at step 207, bot performance computing platform 110 may receive, via the communication interface (e.g., communication interface 113) and while the first and/or second wireless data connection is established, from one or more data source computer systems (e.g., from enterprise server infrastructure 120, enterprise user computing device 130, and/or one or more other data sources), metadata information. The metadata information may, for instance, include transaction metadata. The metadata information may, for instance, identify information about specific transactions being conducted (e.g. automatically by a computer system or manually by an individual) as part of a given process. For example, the metadata may be indicative of a measure associated with a transaction processing task (e.g., a time to complete an item in the work queue, resources used to complete an item in the work queue, etc.).

At step 208, based on the received metadata information, bot performance computing platform 110 may assign (e.g., via value identification module 112c), in real-time, a value metric associated with completion of each item in the work queue of items. For example, bot performance computing platform 110 may assign a value (e.g., a benefit or cost savings) to each item in the work queue of items corresponding to a transaction processing task. The value metric associated with completion of each item in the work queue of items may be assigned based on industry standards or guidelines, standards as established by an enterprise, or the like. In some examples, in assigning the value metric associated with completion of each item in the work queue of items, bot performance computing platform 110 may retrieve the one or more value metrics from a database (e.g., a database on the enterprise server infrastructure 120, enterprise user computing device, bot performance computing platform 110, or the like). In some instances, the value metric may include a value in a currency (e.g., in dollars or other currency or standard of value).

Figure 2C:
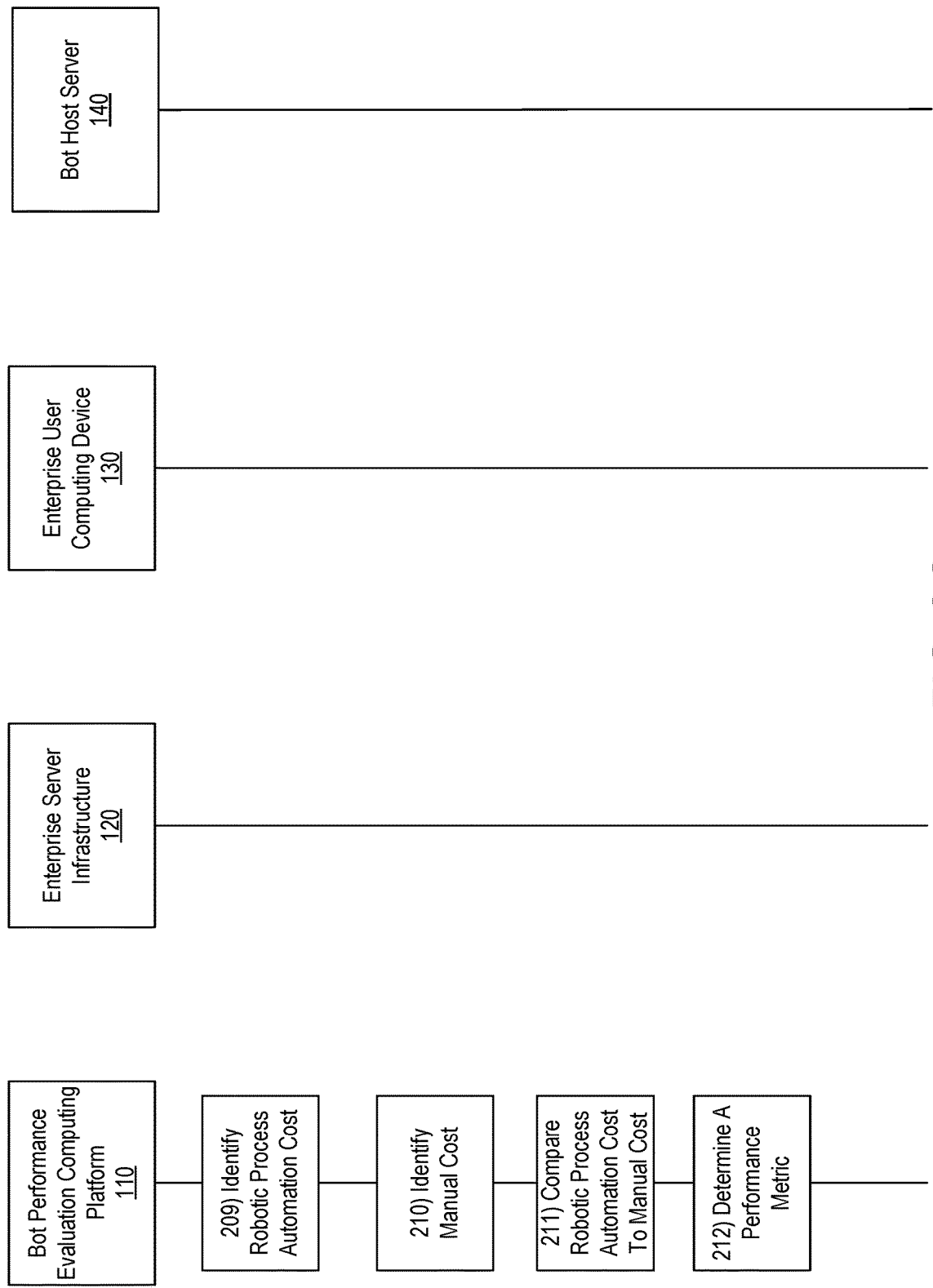

Referring to FIG. 2C, at step 209, bot performance computing platform 110 may identify, based on the assigned value metric, a robotic process automation cost associated with processing the work queue of items via the bot. In some examples, the identified robotic process automation cost may include a salary cost (e.g., salaries of developers or bot builders), a build cost (e.g., to design, build, test, and deploy the bot), a license cost (e.g., software licenses), a support cost (e.g., governance costs, patching, releases), and/or the like.

At step 210, bot performance computing platform 110 may identify a cost to process the work queue of items via another operation (e.g., via a manual operation or a method other than robotic process automation). For example, the cost of an existing manual process may include a number of full-time equivalent (FTE) individuals, a cost of the FTE individuals (e.g., annual total FTE wages), a number of times a process is performed (e.g., per day), an amount of time required to perform a process (e.g., in minutes or hours), and/or the like.

At step 211, bot performance computing platform 110 may compare the robotic process automation cost to the cost to otherwise perform the functions of the bot (e.g., implementing functions of the bot manually or via a method other than robotic process automation).

At step 212, bot performance computing platform 110 may determine a performance metric, such as return on investment (ROI) for the bot based on the comparison. In determining the performance metric, bot performance computing platform 110 may, for instance, identify how much value is saved or could be saved by eliminating or optimizing one or more process steps using an RPA bot.

Referring to FIG. 2D, in some examples, at step 213, a predetermined threshold (e.g., ROI threshold value) may be set, and the performance metric (e.g., ROI) compared to the predetermined threshold. The predetermined threshold may be established by an enterprise organization, for example. Based on the performance metric (e.g., ROI) for the bot being below the predetermined threshold (e.g., an ROI falls short of assumptions), bot performance computing platform 110 may, at step 213, halt processing of the work queue of items using the bot. For instance, if a bot's performance is determined to be suboptimal, the bot may be further optimized or disabled for further maintenance and development. Otherwise, the processing of the work queue of items using the bot will continue.

At step 214, bot performance computing platform 110 may dynamically generate, in real-time, an indication of the determined performance metric for the bot. In some examples, bot performance computing platform 110 may dynamically update the performance metric for the bot as new items in the work queue of items are processed. Accordingly, in some examples, evaluation of bot performance may be continuously performed, thereby providing a real-time indication of bot performance.

Figure 3:
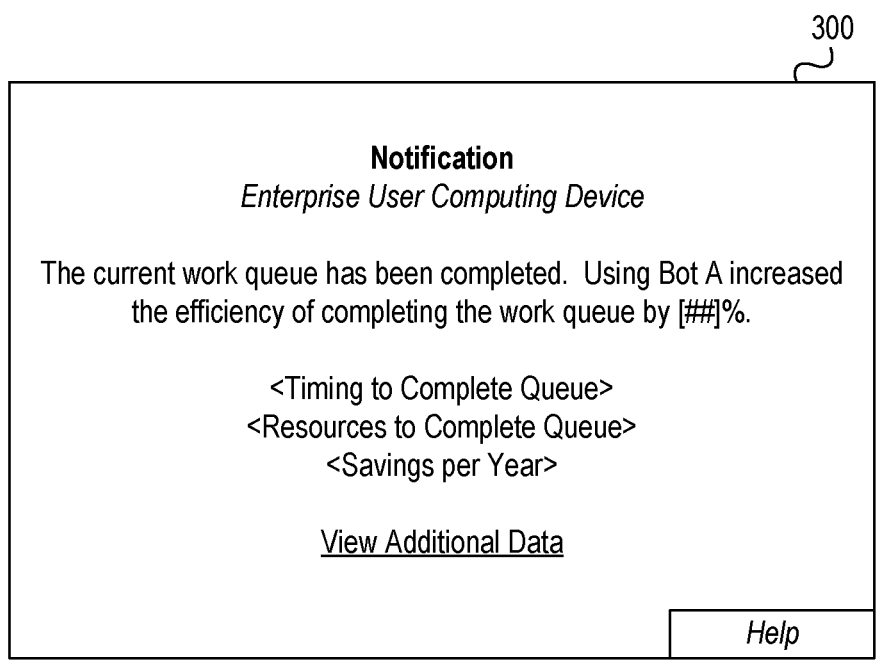
FIG. 3 depicts an example graphical user interface for intelligent bot performance tracking and analysis in accordance with one or more example arrangements.

At step 215, bot performance computing platform 110 may transmit, via the communication interface (e.g., communication interface 113) and while the second wireless data connection is established, to a user computing device (e.g., enterprise user computing device 130) for display, the dynamically generated indication. In turn, at step 216, the user computing device (e.g., enterprise user computing device 130) may display the real-time performance metrics. In providing the display related to the performance metric (e.g., ROI) of the bot processing the associated work queue of items, bot performance computing platform 110 may generate and/or send information to a device linked to an enterprise associate (e.g., enterprise user computing device 130) which may cause enterprise user computing device 130 to generate, display, and/or otherwise present a graphical user interface similar to graphical user interface 300, which is illustrated in FIG. 3. As seen in FIG. 3, graphical user interface 300 may include text and/or other information indicating that a current work queue has been completed and providing an indication of efficiency increases provided as a result of using bot performance computing platform 110 (e.g., "The current work queue has been completed. Using Bot A increased the efficiency of completing the work queue by [##]%."), providing the workload completion results produced using the bot (e.g., timing to complete the work queue, resources used to complete the work queue, savings per year, and the like), as well as one or more user-selectable controls allowing the user of enterprise user computing device 130 to view the additional data relating to bot performance and associated parameters (e.g., "View Additional Data"). In this way, a user may view the benefits of an RPA solution in real-time.

Subsequently, bot performance computing platform 110 may repeat one or more steps of the example event sequence discussed above in tracking and facilitating analysis of bot performance. Additionally or alternatively, bot performance computing platform 110 may initiate one or more workload analysis processes and/or generate and send one or more data results interfaces, similar to how bot performance computing platform 110 may initiate such processes and generate and send such interfaces in the examples described above.

Figure 4:
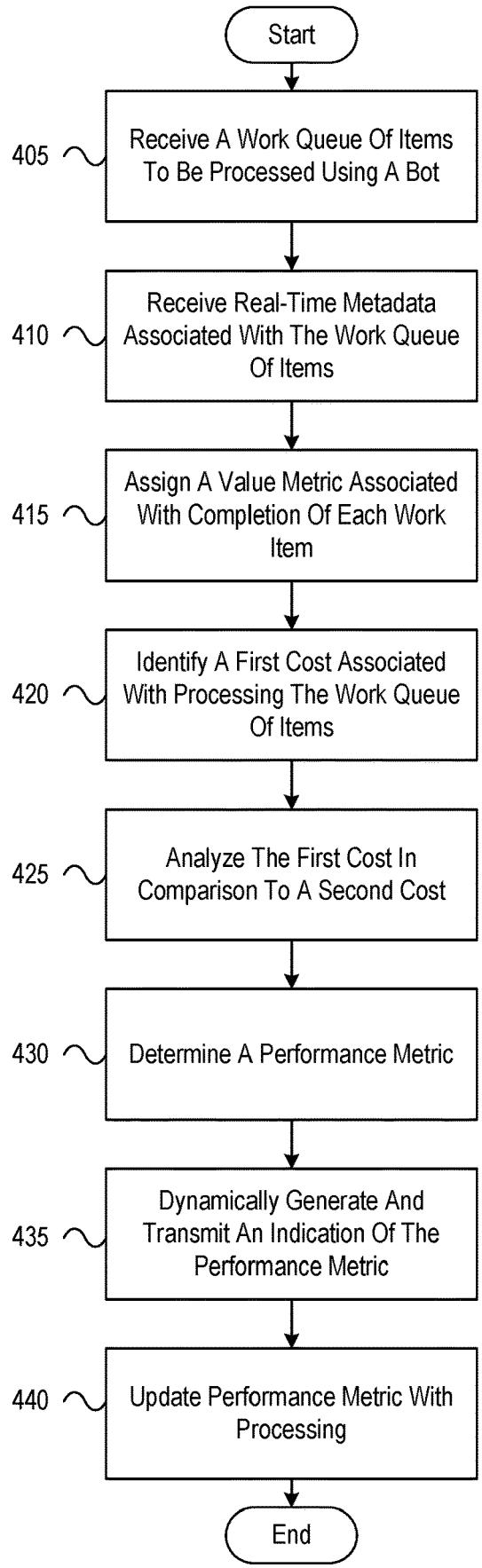
FIG. 4 depicts an illustrative method for intelligent bot performance tracking and analysis in accordance with one or more example arrangements.

FIG. 4 depicts an illustrative method for intelligent bot performance tracking and analysis in accordance with one or more example embodiments. Referring to FIG. 4, at step 405, a computing platform having at least one processor, a communication interface, and memory may, receive a work queue of items to be processed using a robotic process automation (RPA) bot. At step 410, the computing platform may receive, in real-time with processing of the work queue of items using the bot, metadata associated with the work queue of items. At step 415, the computing platform may assign, in real-time, based on the metadata, a value metric associated with completion of each item in the work queue of items. At step 420, the computing platform may identify, based on the assigned value metric, a robotic process automation cost associated with processing the work queue of items via the bot. At step 425, the computing platform may compare the robotic process automation cost to a cost to process the work queue of items via another operation. At step 430, the computing platform may determine a performance metric for the bot based on the comparison. At step 435, the computing platform may dynamically generate, in real-time, an indication of the determined performance metric for the bot, and transmit the dynamically generated indication to a user computing device for display. At step 440, the computing platform may dynamically update the performance metric for the bot as new items in the work queue of items are processed.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive a work queue of items to be processed using a robotic process automation (RPA) bot;
   receive, in real-time with processing of the work queue of items using the bot, metadata associated with the work queue of items;
   assign, in real-time, based on the metadata, a value metric associated with completion of each item in the work queue of items;
   identify, based on the assigned value metric, a robotic process automation cost associated with processing the work queue of items via the bot;

compare, the robotic process automation cost to a cost to process the work queue of items via another operation;

determine a performance metric for the bot based on the comparison;

dynamically generate, in real-time, an indication of the determined performance metric for the bot; and transmit, to a user computing device for display, the dynamically generated indication.

2. The computing platform of claim 1, wherein the memory further stores computer-readable instructions that, when executed by the at least one processor, cause the computing platform to:

based on the performance metric for the bot being below a predetermined threshold, halt processing of the work queue of items using the bot.

3. The computing platform of claim 1, wherein assigning the value metric associated with completion of each item in the work queue of items comprises retrieving one or more value metrics from a database.

4. The computing platform of claim 1, wherein the value metric comprises a value in a currency.

5. The computing platform of claim 1, wherein the memory further stores computer-readable instructions that, when executed by the at least one processor, cause the computing platform to:

dynamically update the performance metric for the bot as new items in the work queue of items are processed.

6. The computing platform of claim 1, wherein the bot is an attended bot.

7. The computing platform of claim 1, wherein the bot is an unattended bot.

8. The computing platform of claim 1, wherein the cost to process the work queue of items via another operation is associated with implementing functions of the bot via a method other than robotic process automation.

9. The computing platform of claim 1, wherein identifying the robotic process automation cost further comprises identifying one or more of: a salary cost, a build cost, a license cost, or a support cost.

10. The computing platform of claim 1, wherein each item in the work queue of items corresponds to a transaction processing task.

11. A method, comprising:

at a computing platform comprising at least one processor, a communication interface, and memory:

receiving, by the at least one processor, via the communication interface, a work queue of items to be processed using a robotic process automation (RPA) bot;

receiving, by the at least one processor, via the communication interface, in real-time with processing of the work queue of items using the bot, metadata associated with the work queue of items;

assigning, by the at least one processor, in real-time, based on the metadata, a value metric associated with completion of each item in the work queue of items;

identifying, by the at least one processor, based on the assigned value metric, a robotic process automation cost associated with processing the work queue of items via the bot;

comparing, by the at least one processor, the robotic process automation cost to a cost to process the work queue of items via another operation;

determining, by the at least one processor, a performance metric for the bot based on the comparison;

dynamically generating, by the at least one processor, in real-time, an indication of the determined performance metric for the bot; and transmitting, by the at least one processor, via the communication interface, to a user computing device for display, the dynamically generated indication.

12. The method of claim 11, further comprising:

based on the performance metric for the bot being below a predetermined threshold, halting, by the at least one processor, processing of the work queue of items using the bot.

13. The method of claim 11, wherein assigning the value metric associated with completion of each item in the work queue of items comprises retrieving one or more value metrics from a database.

14. The method of claim 11, wherein the value metric comprises a value in a currency.

15. The method of claim 11, further comprising:

dynamically updating, by the at least one processor, the performance metric for the bot as new items in the work queue of items are processed.

16. The method of claim 11, wherein the bot is an unattended bot.

17. The method of claim 11, wherein the cost to process the work queue of items via another operation is associated with implementing functions of the bot via a method other than robotic process automation.

18. The method of claim 11, wherein identifying the robotic process automation cost further comprises identifying one or more of: a salary cost, a build cost, a license cost, or a support cost.

19. The method of claim 11, wherein each item in the work queue of items corresponds to a transaction processing task.

20. One or more non-transitory computer-readable media storing instructions that, when executed by a computing platform comprising at least one processor, a communication interface, and memory, cause the computing platform to:

receive, via the communication interface, a work queue of items to be processed using a robotic process automation (RPA) bot;

receive, via the communication interface, in real-time with processing of the work queue of items using the bot, metadata associated with the work queue of items;

assign, in real-time, based on the metadata, a value metric associated with completion of each item in the work queue of items;

identify, based on the assigned value metric, a robotic process automation cost associated with processing the work queue of items via the bot;

compare, the robotic process automation cost to a cost to process the work queue of items via another operation;

determine a performance metric for the bot based on the comparison;

dynamically generate, in real-time, an indication of the determined performance metric for the bot; and transmit, via the communication interface, to a user computing device for display, the dynamically generated indication.

* * * * *